United States Patent
Han

(10) Patent No.: US 10,224,782 B2
(45) Date of Patent: Mar. 5, 2019

(54) MOTOR WITH LEAD WIRES COUPLED TO COIL ENDS

(71) Applicant: LG INNOTEK CO., LTD., Seoul (KR)

(72) Inventor: Cheong Un Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 214 days.

(21) Appl. No.: 15/340,176

(22) Filed: Nov. 1, 2016

(65) Prior Publication Data

US 2017/0126092 A1  May 4, 2017

(30) Foreign Application Priority Data

Nov. 3, 2015  (KR) .................. 10-2015-0153867

(51) Int. Cl.
| | |
|---|---|
| H02K 3/28 | (2006.01) |
| H02K 5/22 | (2006.01) |
| H02K 1/14 | (2006.01) |
| H02K 1/27 | (2006.01) |
| H02K 3/18 | (2006.01) |
| H02K 5/04 | (2006.01) |
| H02K 3/52 | (2006.01) |

(52) U.S. Cl.
CPC ............ *H02K 5/225* (2013.01); *H02K 1/145* (2013.01); *H02K 1/2706* (2013.01); *H02K 3/18* (2013.01); *H02K 3/522* (2013.01); *H02K 5/04* (2013.01); *H02K 2203/06* (2013.01)

(58) Field of Classification Search
CPC ............ H02K 5/225; H02K 5/04; H02K 3/18; H02K 3/522; H02K 1/145; H02K 1/2806; H02K 2203/06; H02K 3/28; H02K 3/50

USPC ............................................ 310/71; 439/557
See application file for complete search history.

(56) References Cited

U.S. PATENT DOCUMENTS

| | | | |
|---|---|---|---|
| 2005/0179329 A1* | 8/2005 | Okazaki .................. | H02K 5/225 310/71 |
| 2012/0112582 A1* | 5/2012 | Kim ........................ | H02K 3/522 310/71 |
| 2015/0015095 A1* | 1/2015 | Kurono .................. | H02K 5/225 310/54 |
| 2015/0188377 A1* | 7/2015 | Kim ........................ | H02K 3/522 310/71 |

FOREIGN PATENT DOCUMENTS

| | | |
|---|---|---|
| EP | 2 458 715 | 5/2012 |
| EP | 2 892 114 | 7/2015 |

OTHER PUBLICATIONS

European Search Report dated Mar. 9, 2017 issued in Application No. 16193997.0.

\* cited by examiner

*Primary Examiner* — Michael Andrews
(74) *Attorney, Agent, or Firm* — KED & Associates, LLP

(57) ABSTRACT

A motor includes a shaft, a rotor disposed at the shaft, a stator disposed on an outer side of the rotor, a busbar disposed on the stator, a housing accommodating the rotor, the stator, and the busbar, and having an opening formed on one side thereof, and a bracket disposed on a side of the opening of the housing. The busbar includes a busbar body, a reinforcing rib disposed to protrude from an upper surface of the busbar body, and a weight groove formed in a lower surface of the busbar body.

12 Claims, 20 Drawing Sheets

FIG. 12A

| Frequency (Hz) | ASD/PSD ($G^2$/Hz) |
|---:|---:|
| 20 | 0.0020 |
| 55 | 0.0550 |
| 175 | 0.3500 |
| 275 | 0.0150 |
| 480 | 0.0150 |
| 510 | 0.0350 |
| 1350 | 0.0350 |
| 1800 | 0.3700 |
| 2000 | 0.3700 |

MOTOR (2)

EMBODIMENT 1 OF MOTOR (1)

EMBODIMENT 2 OF MOTOR (1)

FIG. 14A

| Section | MOTOR (2) BUSBAR | EMBODIMENT 1 OF MOTOR (1) | | | EMBODIMENT 2 OF MOTOR (1) | | |
|---|---|---|---|---|---|---|---|
| | | BUSBAR | MOTOR (2)−EMBODIMENT 1 OF MOTOR (1) | EFFECT(%) | BUSBAR | MOTOR (2)−EMBODIMENT 2 OF MOTOR (1) | EFFECT(%) |
| E | 0.00067 | 0.00055 | 0.00012 | 18% | 0.00051 | 0.00016 | 24% |
| F | 0.00056 | 0.00047 | 0.00009 | 15% | 0.00044 | 0.00012 | 21% |
| G | 0.00040 | 0.00038 | 0.00002 | 5% | 0.00040 | 0.00000 | 1% |
| H | 0.00035 | 0.00034 | 0.00001 | 3% | 0.00035 | 0.00000 | -1% |
| I | 0.00034 | 0.00031 | 0.00003 | 8% | 0.00035 | -0.00001 | -3% |
| J | 0.00034 | 0.00037 | -0.00003 | -8% | 0.00036 | -0.00002 | -5% |
| Max | 0.00067 | 0.00055 | 0.00012 | 18% | 0.00051 | 0.00016 | 24% |
| Min | 0.00034 | 0.00031 | 0.00003 | 8% | 0.00035 | -0.00001 | -5% |
| Max-Min | 0.00033 | 0.00023 | 0.00009 | 29% | 0.00016 | 0.00017 | 30% |

MOTOR WITH LEAD WIRES COUPLED TO COIL ENDS

CROSS-REFERENCE TO RELATED APPLICATION

This application claims priority under 35 U.S.C. § 119 to Korean Patent Application No. 10-2015-0153867, filed on Nov. 3, 2015, whose entire disclosure is hereby incorporated by reference.

BACKGROUND

1. Field

The present invention relates to a motor.

2. Background

A motor includes a shaft formed to be rotatable, a rotor coupled to the shaft, and stators fixed to an inner side of a housing. Further, the stators are installed along a circumference of the rotor at regular gaps. Therefore, a coil, which generates a rotating magnetic field, is wound around the stator to cause electrical interaction with the rotor, and induces the rotor to be rotated.

A busbar electrically connected to the coil may be disposed at an upper end of the stator. In this case, the busbar may generally include a ring-shaped busbar body and a terminal which is curved and extends from the busbar body. The terminal may be connected to a coil through welding or fusing.

Also, the motor may include a mesh wire assembled to apply power to the coil. However, since the mesh wire is directly connected to the coil, the mesh wire may have a problem in that a fixing force is less uniform in comparison to the coil fixed to the terminal through fusing or welding. Also, there are problems of abrasion and disconnection between the mesh wire and the coil of the stator due to repeated vibrations, noises, and external forces of the motor.

BRIEF DESCRIPTION OF THE DRAWINGS

The embodiments will be described in detail with reference to the following drawings in which like reference numerals refer to like elements wherein:

FIG. 12A is a view illustrating an acceleration spectral density (ASD)/power spectral density (PSD) of the standard motor based on the number of vibrations;

FIG. 14A is a view illustrating a measured value and a result for each position in FIGS. 13A to 13C.

DETAILED DESCRIPTION

Figure 1:
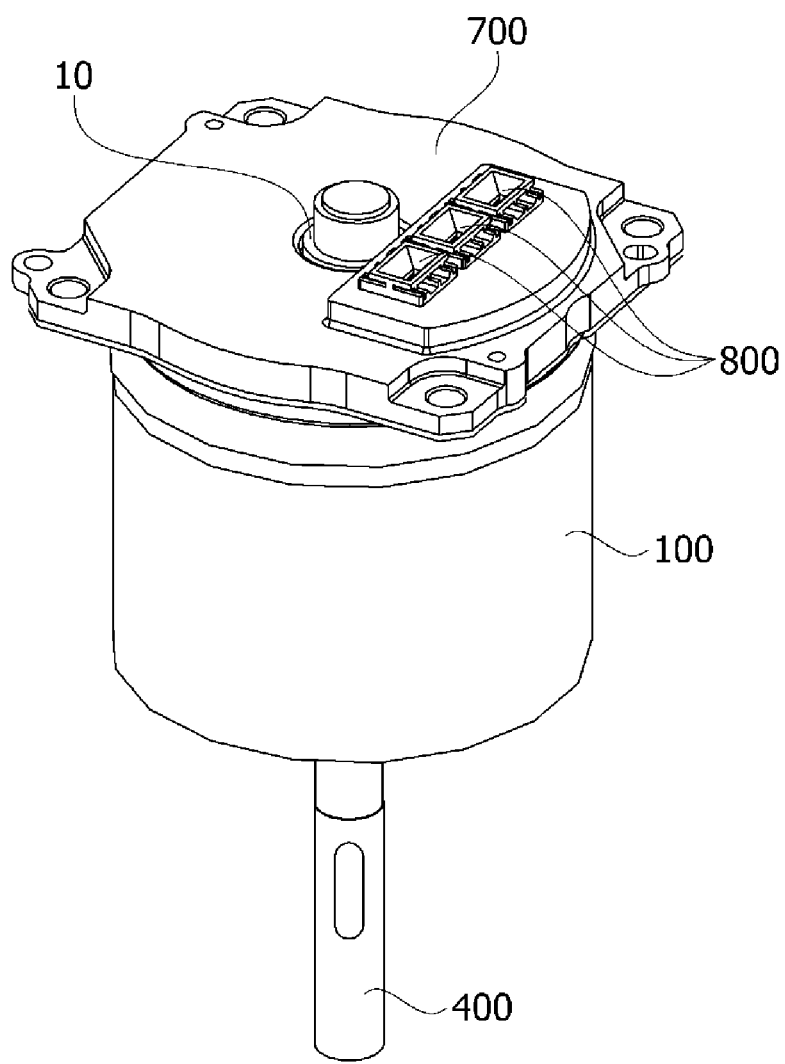
FIG. 1 is a perspective view illustrating a motor according to an embodiment.

While the invention may have various modifications and alternative forms, specific embodiments thereof are shown by way of example in the drawings and will be described in detail herein. It should be understood, however, that there is no intent to limit the invention to the particular forms disclosed and, on the contrary, the invention is to cover all modifications, equivalents, and alternatives falling within the spirit and scope of the invention.

It should be understood that, although the terms "first," "second," etc. may be used herein to describe various elements, these elements are not limited by these terms. These terms are only used to distinguish one element from another. For example, a first element could be termed a second element, and similarly, a second element could be also termed a first element, without departing from the scope of the present invention. As used herein, the term "and/or" includes any and all combinations of one or more of the associated listed items.

It should be understood that, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the following description of the embodiments, it should be understood that, when each element is referred to as being "on" or "under" another element, it can be "directly" on or under another element or can be "indirectly" formed such that an intervening element is also present. In addition, it should also be understood that "on" or "under" one element may mean an upward direction and a downward direction of the element.

The terminology used herein is for the purpose of describing particular embodiments only and is not intended to be limiting of the invention. The singular forms "a" and "an" are intended to include the plural forms as well unless clearly indicated otherwise by context. In the present invention, it should be further understood that the terms "comprise," "comprising," "include," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments of the present invention will be described in detail with reference to the accompanying drawings. The same reference numerals will be used to describe the same or like components, and redundant descriptions thereof will be omitted.

Referring to FIGS. 1 to 8C, a motor 1 according to an embodiment includes a housing 100 having an opening formed on one side thereof, stators 200 disposed inside the housing 100, a rotor 300 disposed inside the housing 100 and rotatably disposed in the stator 200, a shaft 400 rotating with the rotor 300, busbars 500, mesh wire units 600, and a bracket 700 coupled to cover the opening of the housing 100. The bracket 700 may include a terminal hole 710 formed to penetrate the bracket 700. Also, the motor 1 may further include a terminal assembly 800 coupled to one side of the mesh wire unit 600 and disposed in the terminal hole 710.

Figure 2:
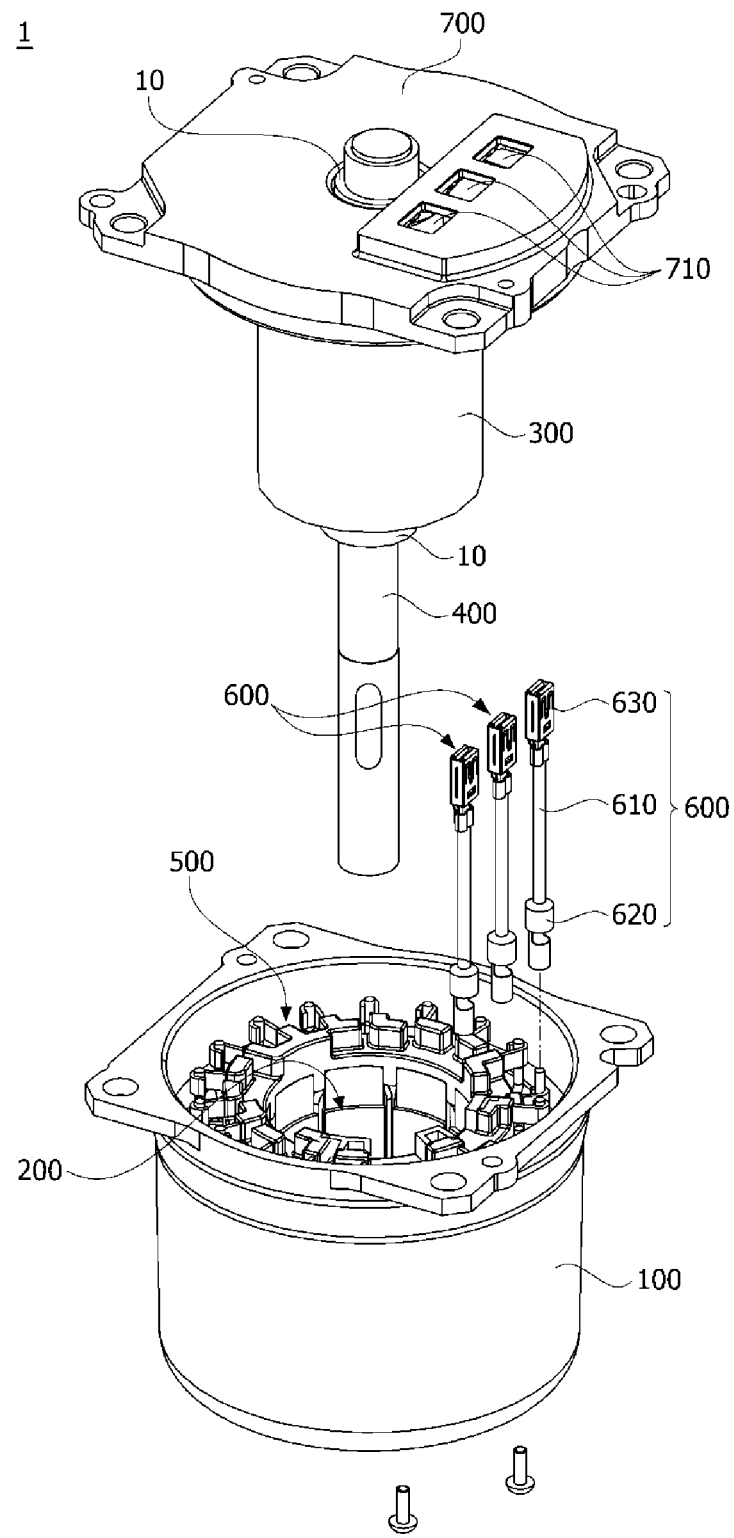
FIG. 2 is an exploded perspective view illustrating the motor according to the embodiment.
Figure 4:
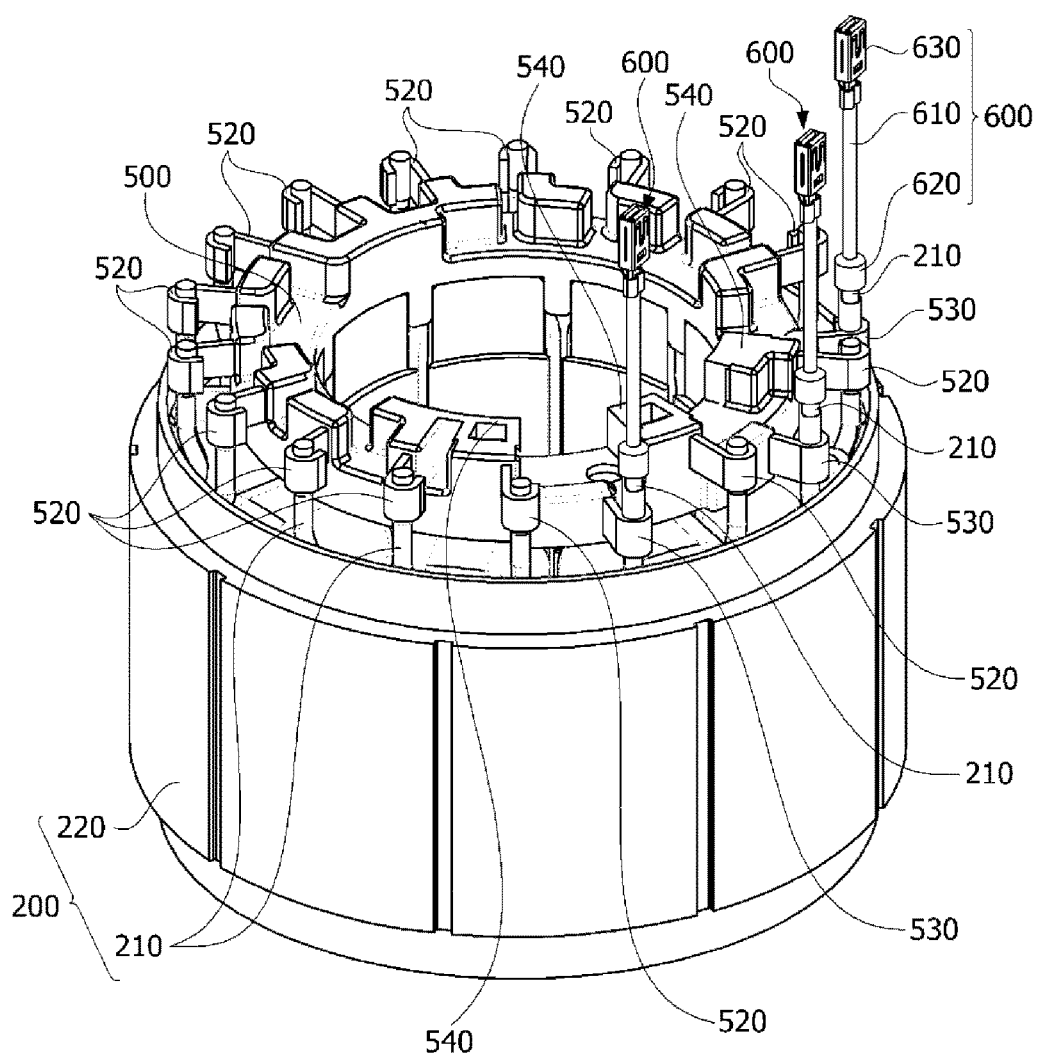
FIG. 4 is a view illustrating a coupling of the busbar, a mesh wire, and the stator of the motor according to the embodiment.

Referring to FIG. 2, the stators 200 of the motor 1 may be disposed at an outer side of the rotor 300. The stators 200 may be installed along a circumference of the rotor 300 at regular gaps. As shown in FIG. 4, a coil 210 which generates a rotating magnetic field is wound around the stator 200 to cause electrical interaction with the rotor 300. Therefore, a rotation of the rotor 300 is induced. In this case, an insulated and coated wire may be used as the coil 210.

The housing 100 may include an opening and an accommodating space formed at one side thereof. The stators 200, the rotor 300, the shaft 400, the busbars 500, and the mesh wire units 600 may be disposed in the accommodating space. As shown in FIGS. 1 and 2, the housing 100 may be formed in a cylindrical shape.

Figure 3:
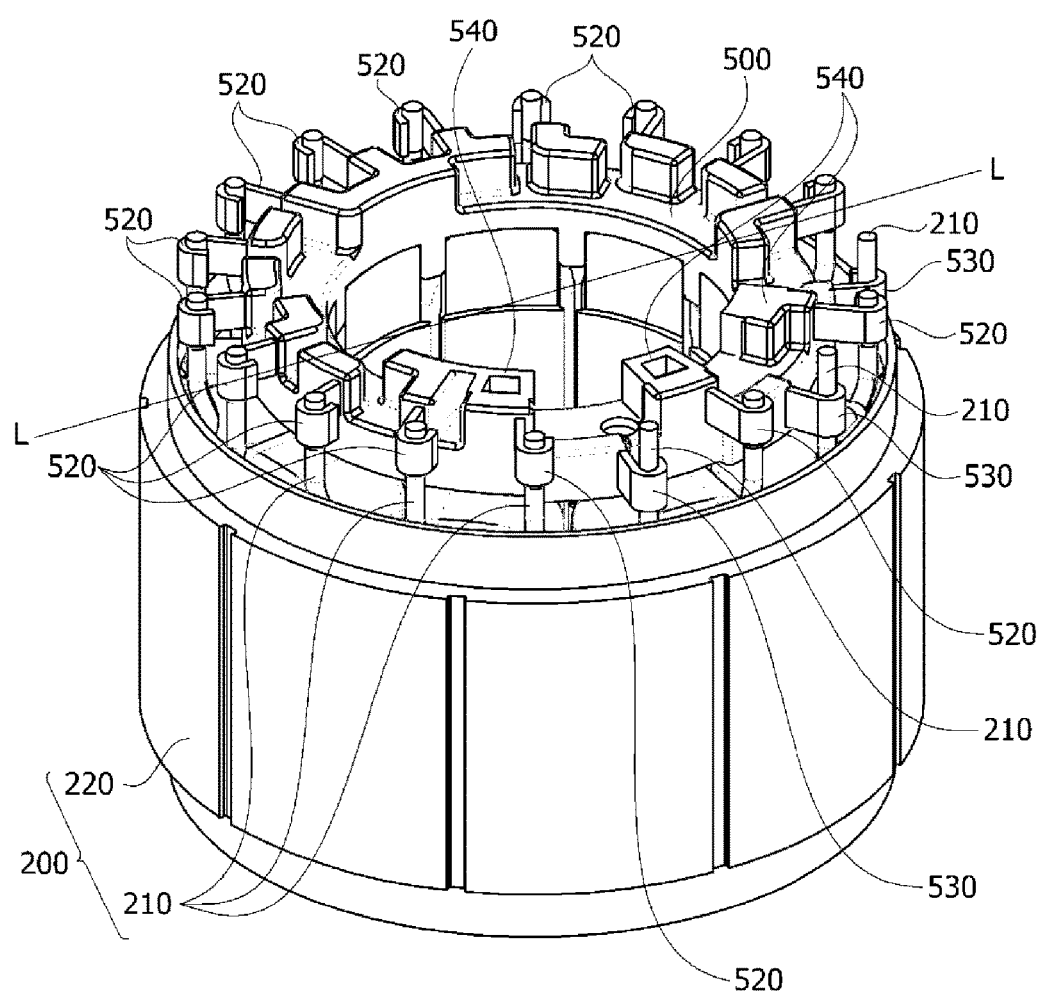
FIG. 3 is a view illustrating a coupling of a busbar and a stator of the motor according to the embodiment.

The stator 200 may have a known form in which the coil 210 is wound around a stator core 220. For example, in the stator 200, the coil 210 may be wound around an integrated stator core 220 or may be wound around a plurality of divided stator cores 220. As shown in FIG. 3, an end of the coil 210 may be disposed to be exposed to the outside (an upper portion of the stator core 220) after winding.

The rotor 300 may include a cylindrical rotor core and a plurality of magnets attached to the rotor core. The rotor 300 may be rotated by electromagnetically interacting with the stator 200.

As shown in FIGS. 1 and 2, the shaft 400 is fixedly inserted into the rotor 300 and may be integrally rotated with the rotor (300). Referring to FIG. 2, bearings 10 may be disposed at an outer circumference of the shaft 400 with the rotor 300 disposed therebetween, and thus the shaft 400 may be rotated inside the housing 100. In this case, the shaft 400 may be formed in a long cylindrical shape.

Figure 5:
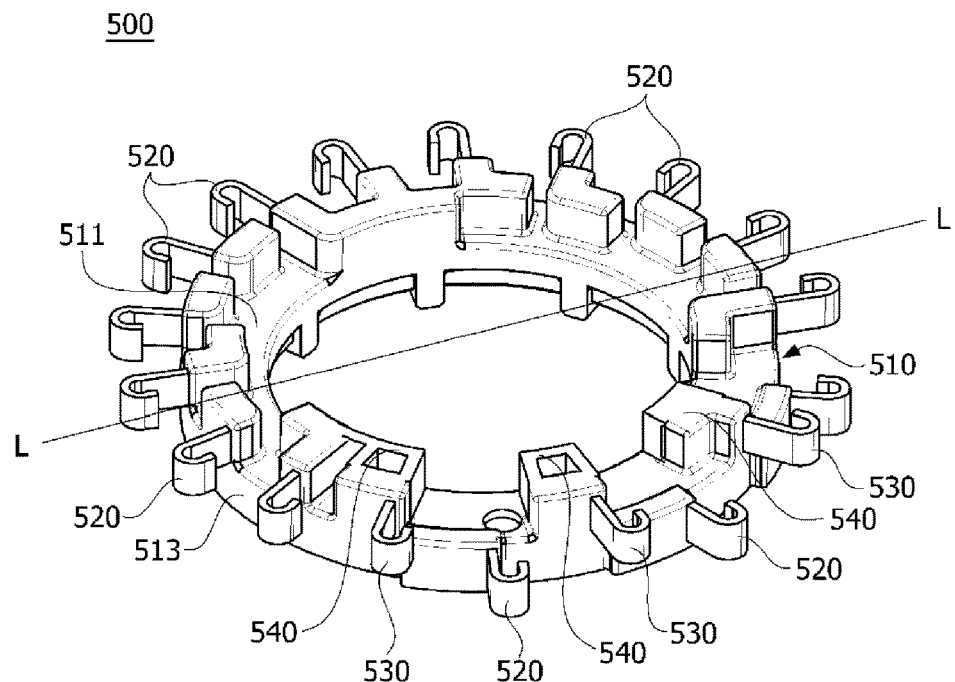
FIG. 5 is a perspective view illustrating the busbar according to the embodiment.

Referring to FIG. 4, the busbar 500 may be disposed on the stator 200. Referring to FIGS. 4 and 5, the busbar 500 may include a busbar body 510, terminals 520, fixing guides 530, reinforcing ribs 540, weight grooves 550, and add ribs 560.

The busbar body 510 may be formed in a ring shape. The busbar body 510 may include an upper surface 511, a lower surface 512, and a side surface 513.

A part of the coil 210 of the stator 200 is coupled to the terminal 520, and the rest of the coil 210 may be coupled to the mesh wire unit 600.

As shown in FIGS. 3 and 4, ends of fifteen coils 210 may be respectively coupled to the terminals 520. Ends of three coils 210 may be respectively coupled to the mesh wire units 600.

Vibration generated due to rotation of the motor 1 may be directly transmitted to the mesh wire unit 600 through the coil 210. However, the coil 210 is fixed by the fixing guide 530, and thus movement of the mesh wire unit 600 may be reduced. The fixing guide 530 may be disposed to protrude from the side surface 513 of the busbar body 510.

As shown in FIGS. 3 and 4, the fixing guide 530 may be formed in a hook shape. An end of the fixing guide 530 may be coupled to an outer circumferential surface of the coil 210. That is, because the fixing guide 530 is formed in the hook shape, the coil 210 may be guided to be disposed at a predetermined position when the coil 210 is disposed. In this case, the fixing guide 530 may be formed of a metallic material and may be coupled to the end of the coil 210 by welding or fusing.

As shown in FIG. 3, the fixing guide 530 may be coupled to the coil 210 so that the end of the coil 210 is exposed. After the fixing guide 530 is coupled to the coil 210, the mesh wire unit 600 may be disposed at the end of the exposed coil 210.

As shown in FIGS. 3 and 4, on the basis of the terminal 520, the fixing guide 530 may be disposed at a level lower than that of the terminal 520 to expose the end of the coil 210 coupled to the fixing guide 530. The terminal 520 may be disposed at the side surface 513 of the busbar body 510.

The reinforcing rib 540 may be disposed to protrude from the upper surface 511 of the busbar body 510. For example, the reinforcing rib 540 may reinforce rigidity by changing the shape of the ring-shaped busbar body 510. Also, the reinforcing rib 540 may control a balance for the center of gravity of the busbar 500 or reinforce the rigidity of the busbar 500.

As shown in FIGS. 3 and 5, the reinforcing rib 540 is disposed on the upper surface 511 of the busbar body 510 and is coupled to the fixing guide 530 with respect to a virtual line L passing through the center of the busbar body 510 to be disposed on the side of the coil 210 having an exposed end thereof.

That is, the reinforcing rib 540 may be disposed at the upper surface 511 of the busbar body 510 and may be disposed on the side of the mesh wire unit 600. In this case, the line L may be referred to as a virtual line dividing the side of the mesh wire 600 and the side opposite the mesh wire unit 600 with respect to the arrangement of the mesh wire unit 600.

The plurality of reinforcing ribs 540 may be disposed to be spaced apart from each other in consideration of the center of gravity of the busbar 500 and vibration caused by rotation of the motor 1. A width and a height of the reinforcing rib 540 may be limited in consideration of the center of gravity and an assembly of the bracket 700. Therefore, the busbar 500 may include the weight groove 550 and the add ribs 560 to control a balance for the center of gravity of the busbar 500 and reinforce rigidity.

Figure 6:
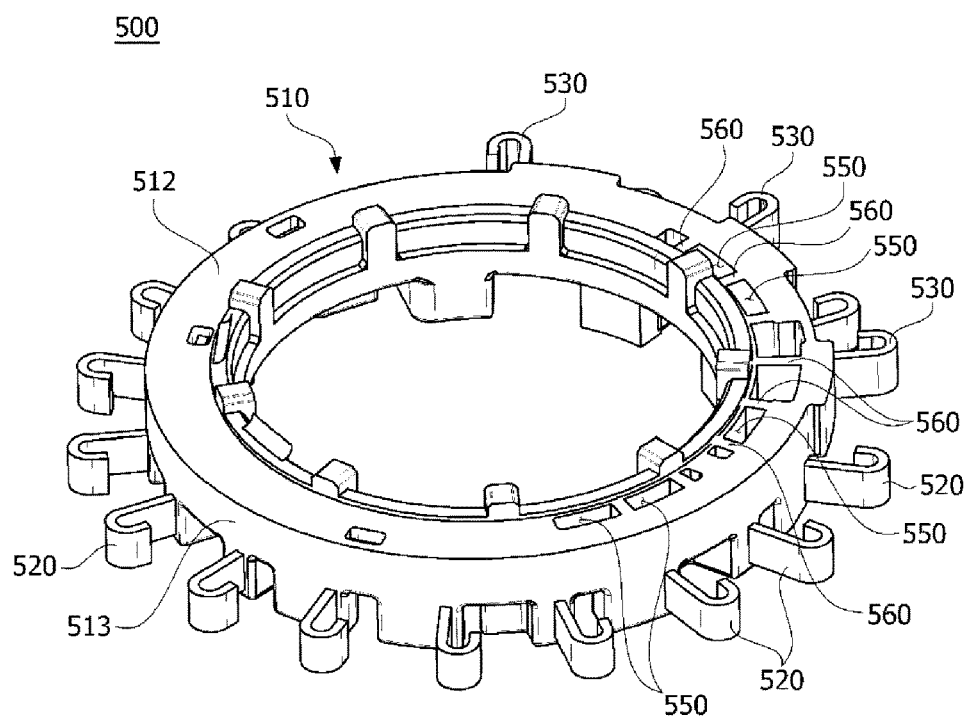
FIG. 6 is a bottom perspective view illustrating the busbar according to the embodiment.

Referring to FIG. 6, the weight groove 550 may be concavely formed in a lower surface of the busbar body 510. The plurality of add ribs 560, as shown in FIG. 6, may be formed in the weight groove 550. The add ribs 560 may reinforce rigidity of the busbar body 510 with the reinforcing rib 540.

One side of the mesh wire unit 600 may be coupled to the end of the exposed coil 210, and the terminal assembly 800 may be disposed on the other side of the mesh wire unit 600. The mesh wire unit 600 may include a mesh wire 610, a clamp 620, and a connection terminal 630.

As shown in FIG. 4, the clamp 620 is disposed on one side of the mesh wire 610, and the connection terminal 630 may be disposed on the other side thereof. The clamp 620 is coupled to the end of the coil 210 to fix the mesh wire unit 600 to the coil 210.

The connection terminal 630 may be coupled to the terminal assembly 800. The bracket 700 may be disposed to cover the opening of the housing 100. The terminal assembly 800 coupled to the connection terminal 630 may be disposed in the terminal hole 710 of the bracket 700.

Figure 7:
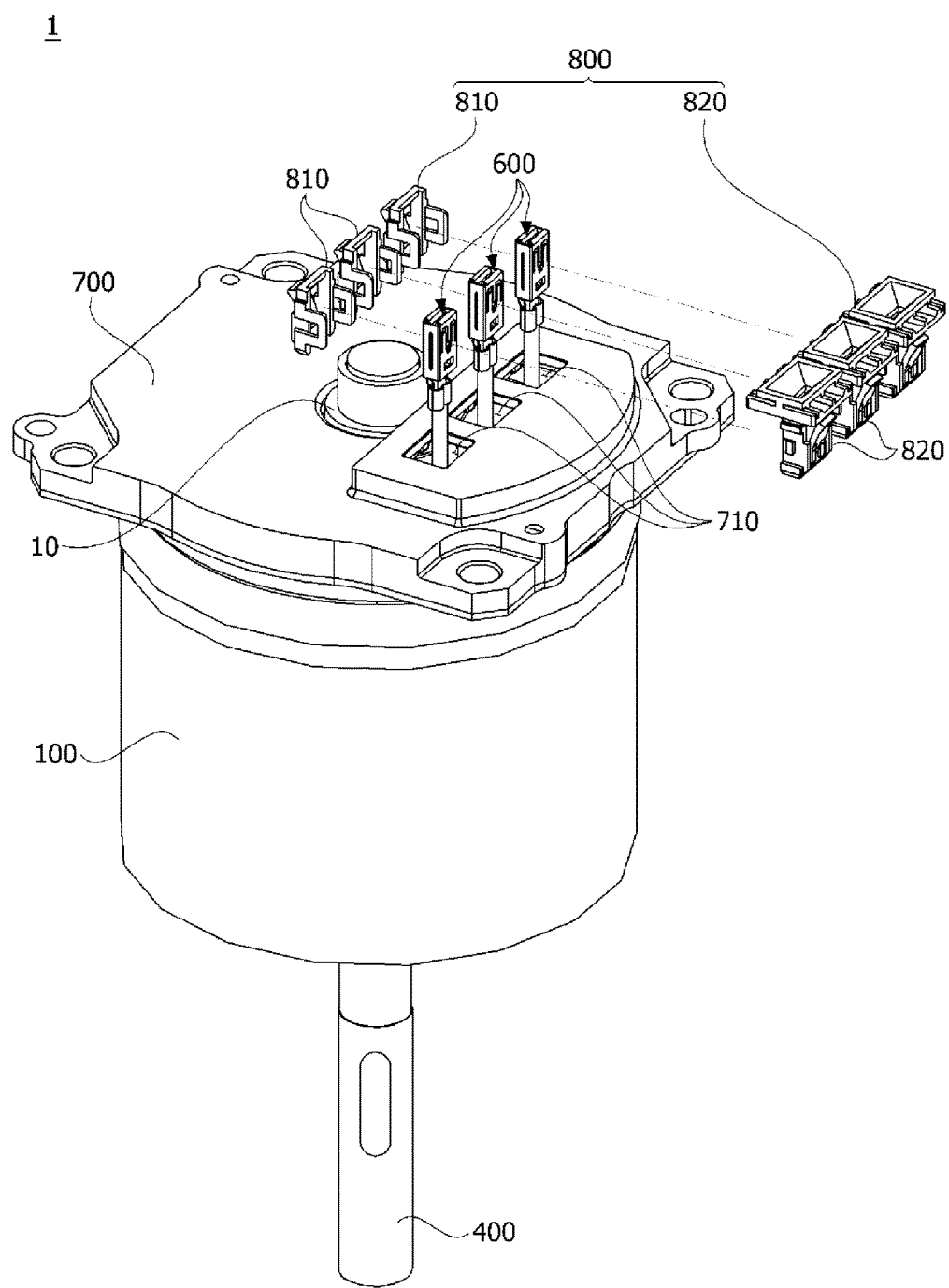
FIG. 7 is a view illustrating a terminal assembly coupled to a connection terminal of the motor according to the embodiment.

Referring to FIG. 7, the terminal assembly 800 may be formed as an arm type including the connection terminal 630. The terminal assembly 800 may allow power to be applied to the motor 1. That is, the terminal assembly 800 may be fixed to the terminal hole 710 so that external power is applied to the coil 210.

In this case, the terminal assembly 800 may include a first part 810 and a second part 820 and may be easily coupled to the connection terminal 630 by coupling the first part 810 and the second part 820.

Figure 8A:
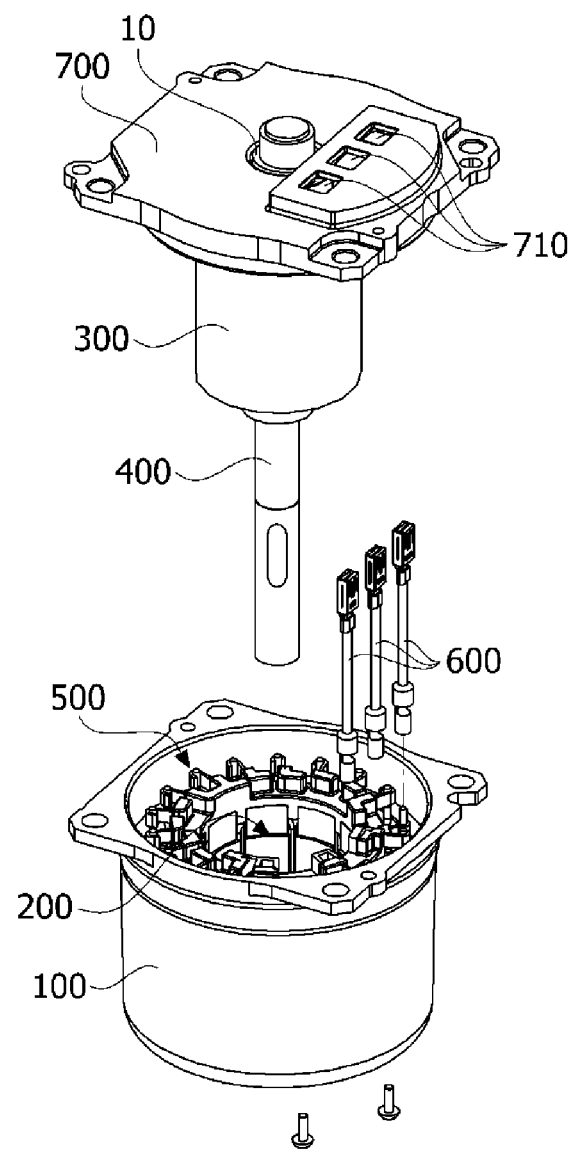
FIG. 8A is an exploded perspective view illustrating the motor according to the embodiment.
Figure 8B:
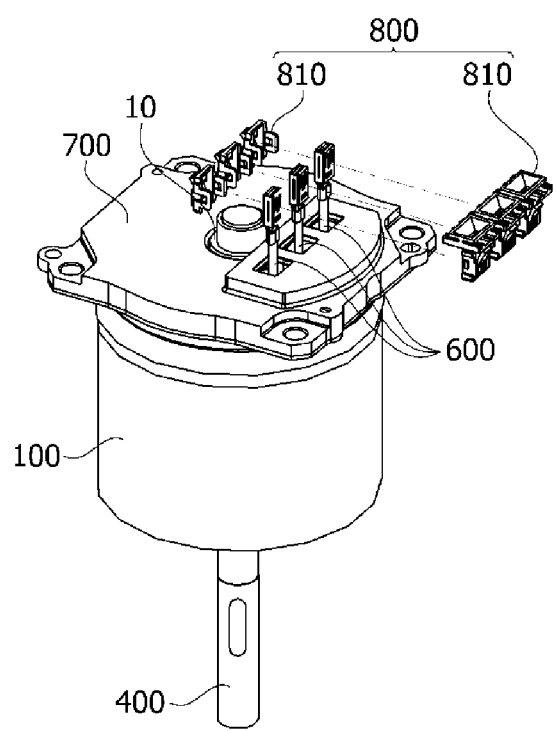
FIG. 8B is a view illustrating a coupling of a terminal hole and the mesh wire of the motor according to the embodiment.

Hereinafter, an assembling process of the motor 1 will be described with reference to FIG. 8. As shown in FIGS. 8A and 8B, the connection terminal 630 connected to the mesh wire 610 passes through the terminal hole 710, and the bracket 700 may be assembled to the housing 100.

Then, the first part 810 and the second part 820 are mutually assembled so that the first part 810 and the second part 820 are coupled to the connection terminal 630. That is, because the first part 810 and the second part 820 are separated from each other, the terminal assembly 800 allows the first part 810 and the second part 820 to be more easily coupled to the connection terminal 630.

Figure 8C:
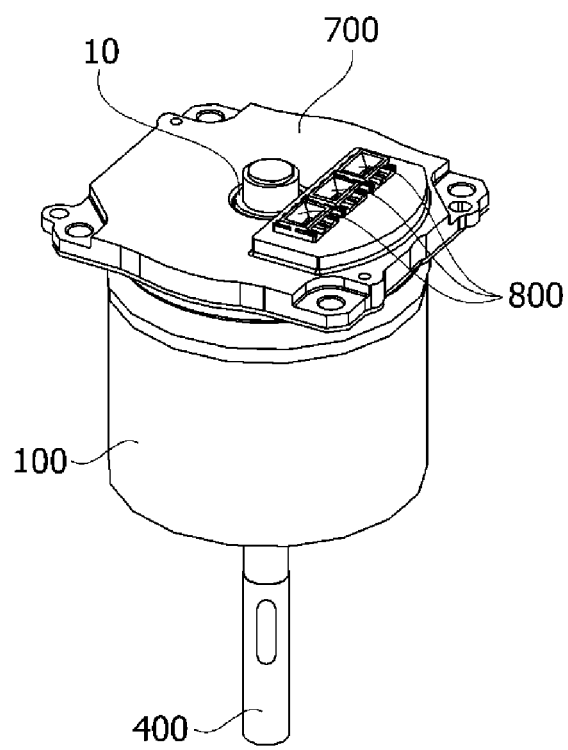
FIG. 8C is a view illustrating a terminal assembly disposed at a bracket of the motor according to the embodiment.

As shown in FIG. 8C, the terminal assembly 800 may be pressurized and inserted into the terminal hole 710. In this case, the terminal assembly 800 may be easily installed in the terminal hole 710 using a hook (not shown) formed on one side thereof.

When the terminal assembly 800 is inserted into the terminal hole 710, abrasion and disconnection between the mesh wire unit 600 and the coil 210 of the stator 200 may be prevented by the fixing guide 530 even if an external force is transmitted to the mesh wire unit 600.

Hereinafter, displacement of the busbar 500 caused by vibration with respect to a standard motor 2 will be described. The vibration may be realized through movement (displacement) vibration according to a position of the busbar when vibration is randomly generated at the stator coupled to the busbar.

Referring to FIGS. 1, 2, 9 and 10, the standard motor 2 further includes a housing 100, stators 200, a rotor 300 disposed inside the housing 100 and rotatably disposed in the stator, a shaft 400 rotating with the rotor 300, busbars 500a, mesh wire units 600, a bracket 700 coupled to cover an opening of the housing 100, and a terminal assembly 800. In the description of the motor 2, the components that are the same as components of the motor 1 are assigned to the same numerals, and redundant descriptions thereof will be omitted.

Figure 9:
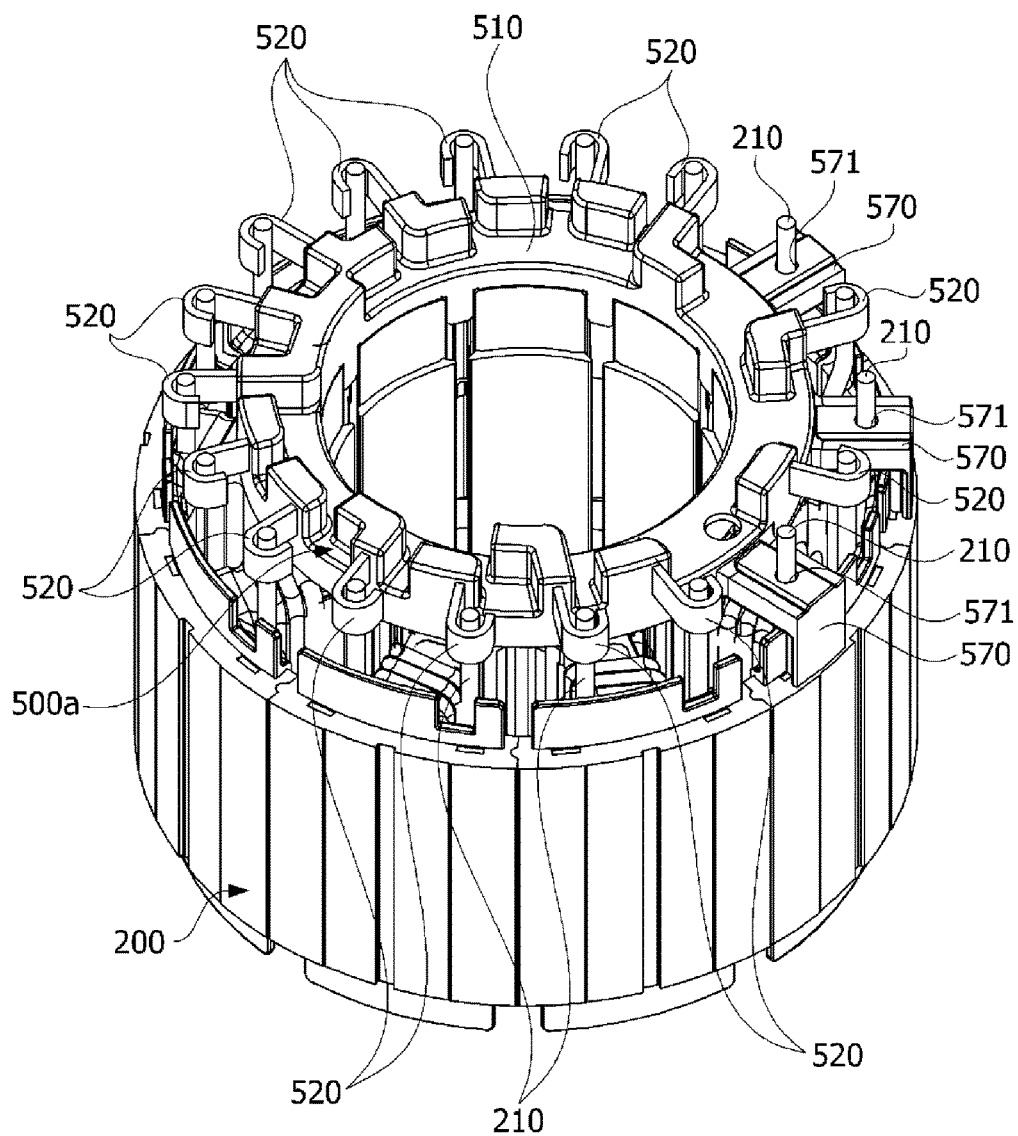
FIGS. 9 and 10 are views illustrating a standard motor.
Figure 10:
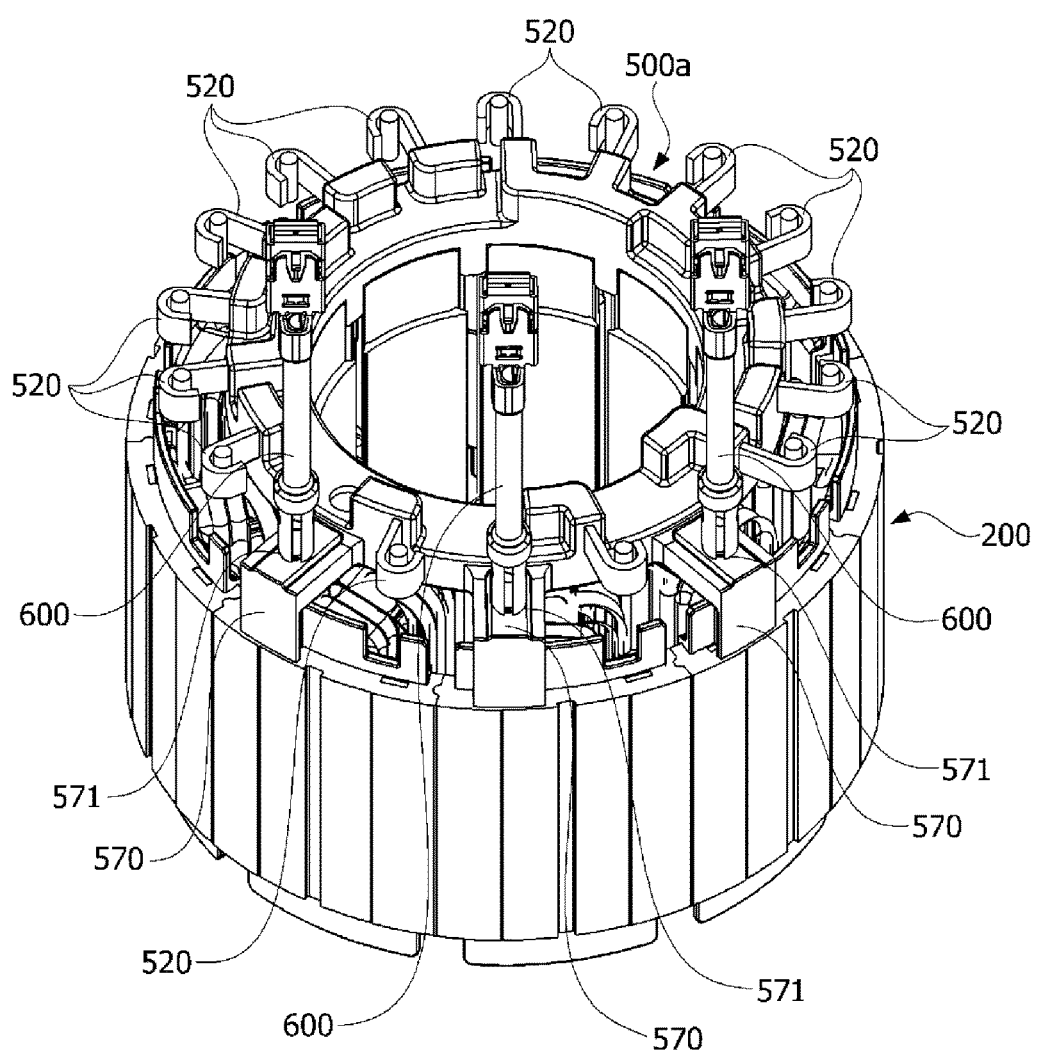

Referring to FIGS. 9 and 10, the busbar 500a may include a busbar body 510, a terminal 520, and a protrusion 570. As shown in FIG. 9, the protrusion 570 may be formed to protrude outward from the busbar body 510. The protrusion 570 may include a through hole 571 through which the coil 210 passes so that the coil 210 is disposed at a predetermined position.

The motor 2 has a busbar which is different from the busbar of the motor 1 in shape. That is, there is a difference in which the busbar 500a of the motor 2 includes the protrusion 570 instead of the fixing guide 530 of the motor 1.

Figure 11A:
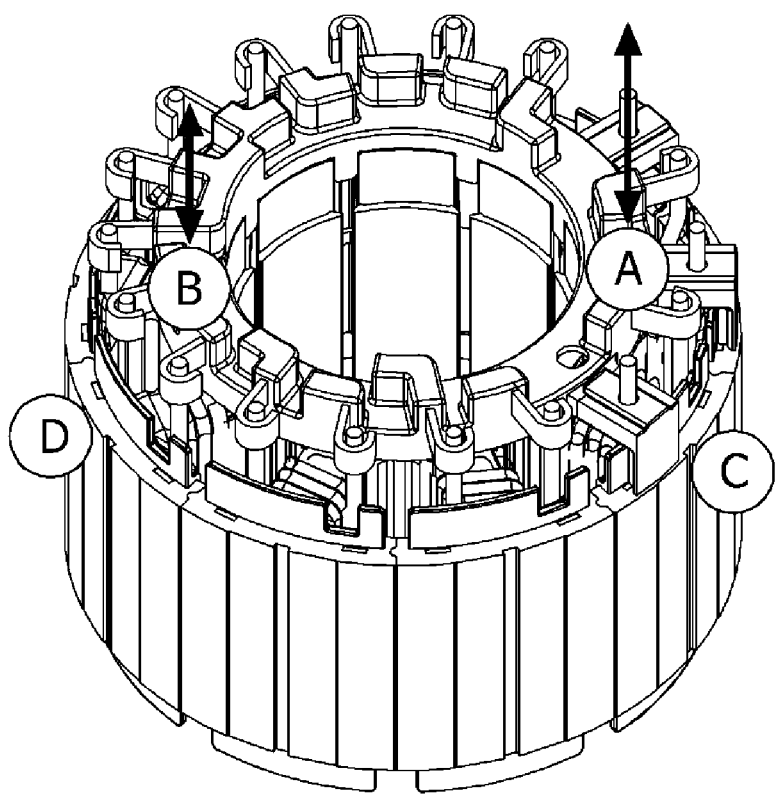
FIG. 11A is a view illustrating a displacement measurement position of the standard motor in accordance with random vibration.
Figure 11B:
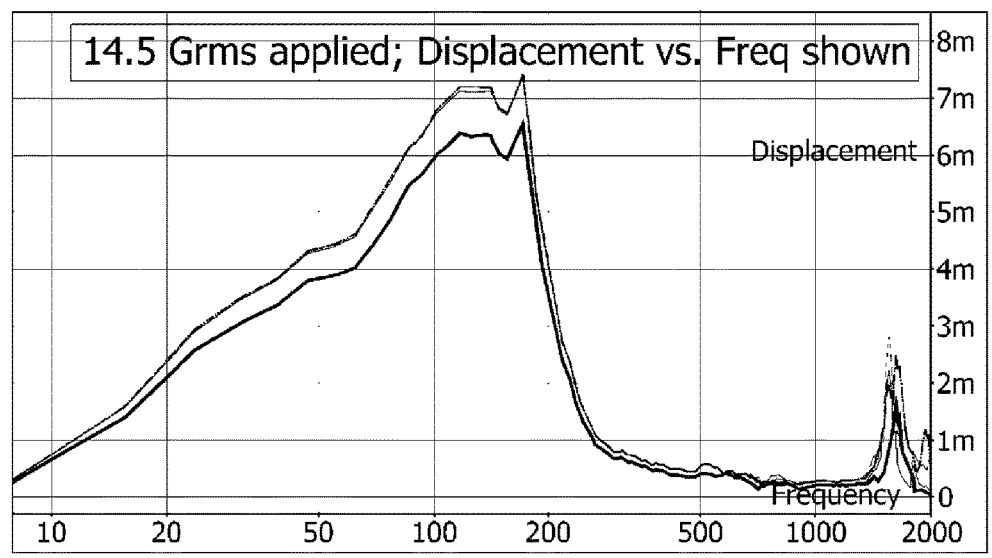
FIG. 11B is a view illustrating a result of the standard motor in accordance with vibration.

FIG. 11A is a view illustrating a displacement measurement position of the motor 2 caused by random vibration, and FIG. 11B is a view illustrating a result caused by the vibration.

Figure 12B:
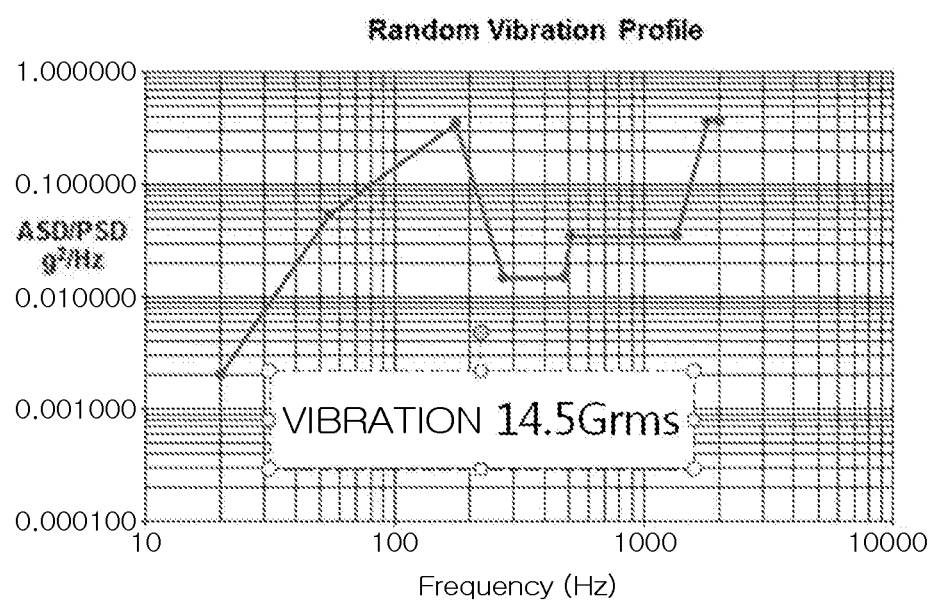
FIG. 12B is a graph illustrating the ASD/PSD of the standard motor based on the number of vibrations.

FIG. 12A is a view illustrating an acceleration spectral density (ASD)/power spectral density (PSD) based on the number of vibrations of the standard motor, and FIG. 12B is a graph illustrating the ASD/PSD based on the number of vibrations of the standard motor.

Referring to FIGS. 11A and 11B, sensors were attached at each position (A, B, C, and D) of the motor and checked movements of the stators 200 and the busbars 500a. The sensor installed at position A measured displacement of the busbar 500a on a side of the mesh wire unit 600 and measured displacement of the busbar 500a on a side opposite the mesh wire unit 600 installed at position B. The sensor installed at position C measured displacement of the stator 200 on the side of the mesh wire unit 600, and the sensor installed at position D measured displacement of the stator 200 on the side opposite the mesh wire unit 600.

Referring to FIGS. 12A and 12B, results in which A (the displacement of the busbar 500a on the side of the mesh wire unit 600)–C (the displacement of the stator 200 on the side of the mesh wire unit 600)=0.0009 mm @ 1632 Hz, and B (the displacement of the busbar 500a on the side opposite the mesh wire unit 600)–D (the displacement of the stator 200 on the side opposite the mesh wire unit 600)=0.00061 mm @ 15622 Hz were shown.

Therefore, the movement of the busbar 500a on the side of the mesh wire unit 600 caused by vibration was greater than that of the busbar 500a on the side opposite the mesh wire unit 600.

Figure 13A:
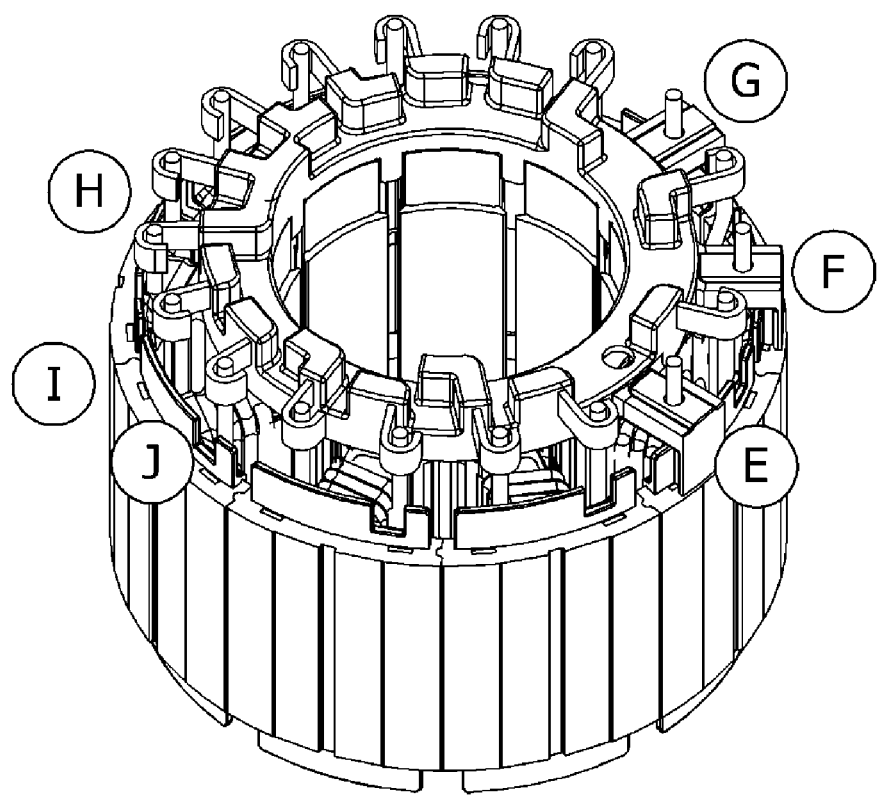
FIG. 13A is a view illustrating a displacement measurement position of the standard motor.
Figure 13B:
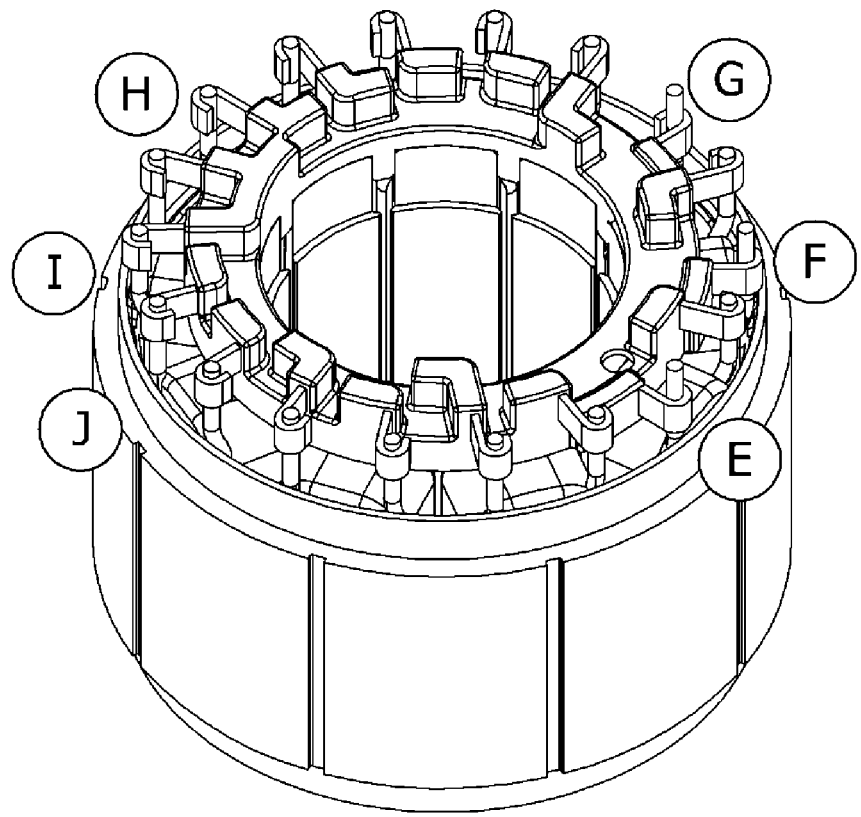
FIG. 13B is a view illustrating a displacement measurement position of embodiment 1 of the motor.
Figure 13C:
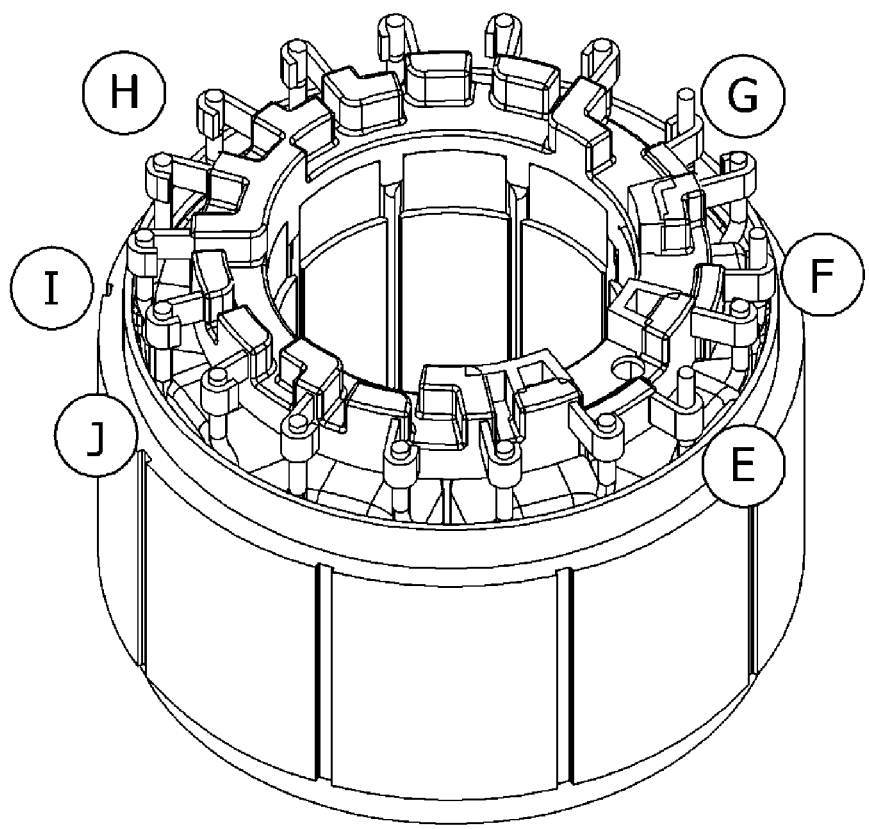
FIG. 13C is a view illustrating a displacement measurement position of embodiment 2 of the motor.

FIG. 13A is a view illustrating the displacement measurement position of the standard motor, FIG. 13B is a view illustrating the displacement measurement position of embodiment 1 of the motor, and FIG. 13C is a view illustrating the displacement measurement position of embodiment 2 of the motor.

Figure 14B:
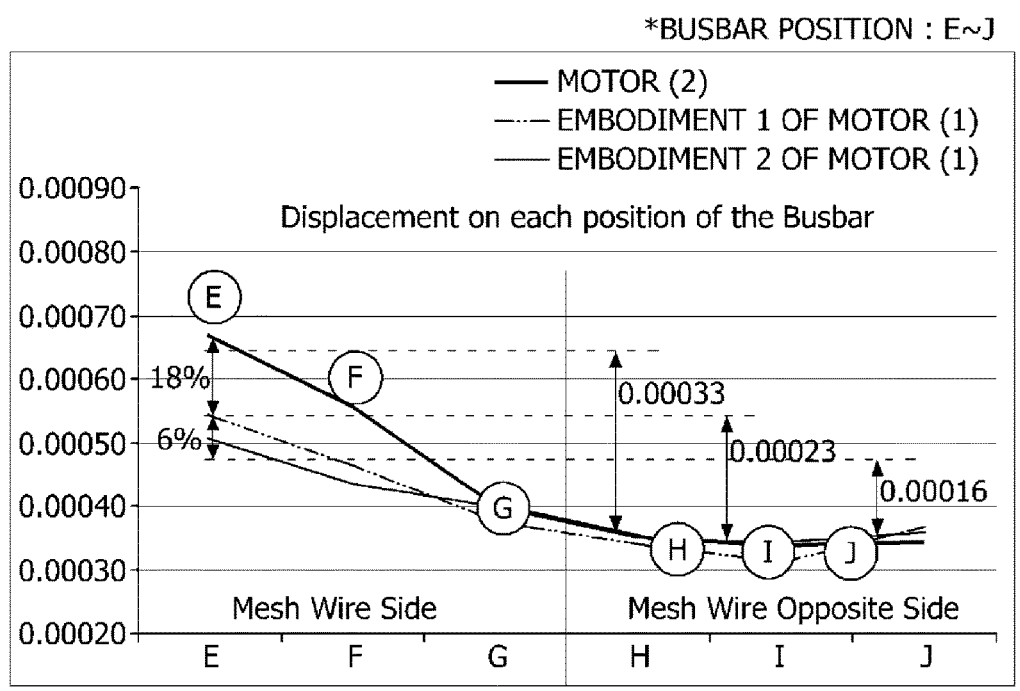
FIG. 14B is a graph illustrating the measured value and the result for each position in FIGS. 13A to 13C.

FIG. 14A is a view illustrating a measured value and a result for each position in FIGS. 13A to 13C, and FIG. 14B is a graph illustrating the measured value and the result for each position in FIGS. 13A to 13C.

In embodiment 1 of a motor 1, a busbar 500 of the motor 1 includes a busbar body 510, a terminal 520, and a fixing guide 530. In embodiment 2 of a motor 1, a busbar 500 may include a busbar body 510, a terminal 520, a fixing guide 530, a reinforcing rib 540, a weight groove 550, and add ribs 560. Therefore, embodiment 1 of the motor 1 and embodiment 2 of the motor 1 may be distinguished by whether the reinforcing rib 540, the weight groove 550 and the add ribs 560 are included therein.

Hereinafter, referring to FIGS. 13A, 13B, 13C, 14A and 14B, it can be seen that movement caused by vibration is reduced by distinguishing the motor 1 of embodiment 1 (the case of the busbar 500 of the motor 1 including the busbar body 510, the terminal 520, and the fixing guide 530) from embodiment 2 (the case of the busbar 500 of the motor 1 including the busbar body 510, the terminal 520, the fixing guide 530, the reinforcing rib 540, the weight groove 550, and the add ribs 560).

That is, in embodiment 1 of the motor 1, the movement of the busbar is reduced by 18% when compared to the motor 2. In embodiment 2 of the motor 1, the movement (the displacement) of the busbar is reduced by 24% when compared to the motor 2.

Therefore, even in the motor 1, the movement of the busbar 500 is reduced more in the case (embodiment 2) where the busbar 500 includes the fixing guide 530, the reinforcing rib 540, the weight groove 550, and the add ribs 560.

As shown in FIGS. 13A, 13B, 13C, 14A and 14B, the motor 1 has effects in which the movement of the mesh wire unit 600 is reduced only by the fixing guide 530, and the movement of the mesh wire unit 600 including the fixing guide 530, the reinforcing rib 540, the weight groove 550, and the add ribs 560 is reduced.

However, the motor 1 can reduce the movement of the mesh wire unit 600 caused by vibration only using the reinforcing rib 540, the weight groove 550, and the add ribs 560 without using the fixing guide 530.

In this case, the reinforcing rib 540 may be disposed on the side of the coil coupled to the mesh wire unit with respect to the virtual line L passing through the center of the busbar body 510. The reinforcing rib 540 may be disposed to protrude from the upper surface 511 of the busbar body 510.

The motor according to the embodiment can reduce movement of a mesh wire caused by vibration using busbars. The vibration may be generated by rotation of the motor or an external force. Also, the motor can further reduce the movement of the mesh wire by forming a reinforcing rib in the busbar.

Objectives are not limited to the above-mentioned objects. That is, other objectives that are not mentioned may certainly be understood by those skilled in the art to which the present invention pertains from the following description.

A motor may include a shaft, a rotor disposed at the shaft, a stator disposed at an outer side of the rotor, a busbar disposed on the stator, a housing accommodating the rotor, the stator and the busbar and having an opening formed on one side thereof, and a bracket disposed on an opening side of the housing, wherein the busbar includes a busbar body, a reinforcing rib disposed to protrude from an upper surface of the busbar body, and a weight groove formed in a lower surface of the busbar body.

The busbar may further include an add rib formed in the weight groove.

The motor may further include a fixing guide disposed to protrude from one side of the busbar body. The fixing guide may be coupled to a coil of the stator so that an end of the coil is exposed.

The motor may further include a mesh wire unit disposed at the exposed end of the coil coupled to the fixing guide.

The mesh wire unit may include a mesh wire, a clamp disposed on one side of the mesh wire to be coupled to the exposed end of the coil, and a connection terminal disposed on the other side of the mesh wire.

The motor may further include a terminal assembly coupled to the connection terminal.

The reinforcing rib may be disposed on a coil side coupled to the mesh wire unit with respect to a virtual line (L) passing through a center of the busbar body.

The fixing guide may be formed in a hook shape and may be disposed on an outer circumferential surface of the coil.

The fixing guide may be formed of a metallic material and may be fused with the coil.

The fixing guide may be disposed at a level lower than that of a terminal disposed at the busbar body.

A motor may also include a shaft, a rotor disposed at the shaft, a stator disposed at an outer side of the rotor, a busbar disposed on the stator, a housing accommodating the rotor, the stator, and the busbar, and having an opening formed on one side thereof, and a bracket disposed on the opening side of the housing. The busbar may include a busbar body, and a fixing guide disposed to protrude from one side of the busbar body, wherein the fixing guide is coupled to a coil of the stator so that an end of the coil is exposed.

The fixing guide may be formed in a hook shape and disposed on an outer circumferential surface of the coil.

The fixing guide may be formed of a metallic material and may be fused with the coil.

The fixing guide may be disposed under a terminal disposed at the busbar body.

The motor may further include a mesh wire unit disposed at the exposed end of the coil coupled to the fixing guide.

The mesh wire unit may include a mesh wire, a clamp disposed on one side of the mesh wire and coupled to the exposed end of the coil, and a connection terminal disposed on the other side of the mesh wire.

The motor may further include a terminal assembly coupled to the connection terminal.

While the present invention has been described with reference to exemplary embodiments, it should be understood by those skilled in the art that various changes and modifications may be made without departing from the spirit and scope of the present invention as defined by the appended claims. It should be understood that differences related to the modifications and changes are included in the scope of the embodiments as defined by the following claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor comprising:
   a shaft;
   a rotor provided at the shaft;
   a stator provided at an outer side of the rotor;

a busbar provided on the stator;

a housing configured to accommodate the rotor, the stator, and the busbar, and having an opening formed at one side thereof; and a bracket provided on a side of the opening of the housing, a lead wire unit disposed at an end of a coil of the stator, wherein the busbar includes:

a busbar body;

a fixing guide disposed to protrude from one side of the busbar body;

a reinforcing rib protruding from a surface of the busbar body facing the bracket; and a weight groove formed in a surface of the busbar body facing the stator, wherein the lead wire unit comprises a lead wire, a clamp disposed on one side of the lead wire, and a connection terminal disposed on the other side of the lead wire, wherein the fixing guide is coupled to the coil of the stator so that the end of the coil is exposed, and wherein the clamp is disposed at the exposed end of the coil coupled to the fixing guide.

2. The motor of claim 1, wherein the busbar further includes an add rib formed in the weight groove.

3. The motor of claim 1, further comprising a terminal assembly coupled to the connection terminal.

4. The motor of claim 3, wherein the reinforcing rib is provided on a side of the coil coupled to the lead wire with respect to a virtual line passing through a center of the busbar body.

5. The motor of claim 1, wherein the fixing guide is formed in a hook shape and is provided on an outer circumferential surface of the coil.

6. The motor of claim 5, wherein the fixing guide is formed of a metallic material and is fused with the coil.

7. The motor of claim 6, wherein the fixing guide is provided between the stator and a terminal arranged at the busbar body.

8. A motor comprising:

a shaft;

a rotor provided at the shaft;

a stator provided at an outer side of the rotor;

a busbar provided on the stator;

a housing configured to accommodate the rotor, the stator, and the busbar, and having an opening formed at one side thereof; and a bracket provided on a side of the opening of the housing, wherein the busbar includes:

a busbar body; and a fixing guide protruding from one side of the busbar body, wherein the fixing guide is coupled to a coil of the stator so that an end of the coil is exposed, wherein a lead wire unit is disposed at the exposed end of the coil coupled to the fixing guide, and wherein the lead wire unit comprises a lead wire, a clamp disposed on one side of the lead wire, and a connection terminal disposed on the other side of the lead wire.

9. The motor of claim 8, wherein the fixing guide is formed in a hook shape and provided on an outer circumferential surface of the coil.

10. The motor of claim 9, wherein the fixing guide is formed of a metallic material and is fused with the coil.

11. The motor of claim 10, wherein the fixing guide is provided at a level lower than that of a terminal arranged at the busbar body.

12. The motor of claim 8, further comprising a terminal assembly coupled to the connection terminal.

* * * * *